United States Patent [19]

Yu

[11] Patent Number: 4,623,245

[45] Date of Patent: Nov. 18, 1986

[54] SYSTEM OF WHITE-LIGHT DENSITY PSEUDOCOLOR ENCODING WITH THREE PRIMARY COLORS

[75] Inventor: Francis T. S. Yu, State College, Pa.

[73] Assignee: The United States of America as represented by the Secretary of the Air Force, Washington, D.C.

[21] Appl. No.: 704,109

[22] Filed: Feb. 21, 1985

[51] Int. Cl.[4] ...................... G03B 27/32; G03B 27/52; G02B 27/42; G02B 27/46

[52] U.S. Cl. ................................ 355/32; 350/162.12; 350/400; 355/67; 355/77; 358/294

[58] Field of Search ....................... 355/77, 32, 35, 46, 355/52, 67; 350/162.12, 3.77, 400; 358/294

[56] References Cited

U.S. PATENT DOCUMENTS

| | | | |
|---|---|---|---|
| 3,425,770 | 2/1969 | Mueller et al. | 350/162.12 |
| 3,917,378 | 11/1975 | Gale | 350/3.77 |
| 3,993,398 | 11/1976 | Noguchi et al. | 350/3.77 |
| 4,082,431 | 4/1978 | Ward, III | 350/162.12 |
| 4,213,673 | 7/1980 | Gale | 350/162.12 |
| 4,445,141 | 4/1984 | Benton et al. | 350/400 X |

OTHER PUBLICATIONS

Yu et al, "White-Light Density Pseudocolor Encoding with Three Primary Colors," J. Optics (Paris), vol. 15, No. 2, Mar./Apr. 1984, pp. 55-58.

S. L. Zhuang et al, "Smeared-Photographic-Image Deblurring Utilizing White-Light-Processing Technique," *Optics Letters,* vol. 6, No. 2, Feb. 1981, pp. 102-104.

F. T. S. Yu, "Technique of White Light Optical Processing with Diffraction Grating Method," *SPIE International Optical Computing Conference,* vol. 232, 1980, pp. 9-14.

B. J. Chang et al, "Silver-Halide Gelatin Holograms," *SPIE Recent Advances in Holography,* vol. 215, 1980, pp. 172-174.

F. T. S. Yu et al, "Multi-Image Regeneration by White Light Processing," *Optics Communications,* vol. 34, No. 1, Jul. 1980, pp. 11-14.

F. T. S. Yu et al, "Real-Time White Light Spatial Frequency and Density Pseudocolor Encoder," *Applied Optics,* vol. 19, No. 17, Sep. 1, 1980, pp. 2986-2990.

T. H. Chao et al, "White-Light Pseudocolor Density Encoding Through Contrast Reversal," *Optics Letters,* vol. 5, No. 6, Jun. 1980, pp. 230-232.

J. Santamaria et al, "Optical Pseudocoloring Through Contrast Reversal Filtering," *J. Optics,* (Paris), vol. 10, No. 4, 1979, pp. 151-155

F. T. S. Yu, "Restoration of a Smeared Photographic Image by Incoherent Optical Processing," *Applied Optics,* vol. 17, No. 22, Nov. 15, 1978, pp. 3571-3575.

Anthony Tai et al, "White-Light Pseudocolor Density Encoder," *Optics Letters,* vol. 3, No. 5, Nov. 1978, pp. 190-192.

F. T. S. Yu, "A New Technique of Incoherent Complex Signal Detection," *Optics Comm.,* vol. 27, No. 1, Oct. 1978, pp. 23-26.

Hua-Kuang Liu et al, "A New Coherent Optical Pseudo-Color Encoder," *Nouv. Rev. Optique,* t. 7, No. 5, 1976, pp. 285-289.

H. C. Andrews et al, "Image Processing by Digital Computer," *IEEE Spectrum,* Jul. 1972, pp. 20-32.

Juris Upatnieks et al, "Diffraction Efficiency of Bleached, Photographically Recorded Interference Patterns," *Applied Optics,* vol. 8, No. 1, Jan. 1969, pp. 85-89.

*Primary Examiner*—Richard A. Wintercorn

*Attorney, Agent, or Firm*—Donald J. Singer; Jacob N. Erlich

[57] ABSTRACT

A process/system of generating density pseudocolor encoding with three primary colors using a white-light optical processor. Spatial encodings are made with positive, negative and product positive and negative photographic image transparencies and the pseudocoloring is obtained by color filtering of the smeared Fourier spectra. The technique is extremely versatile and economical to operate such that it offers a wide range of applications. Since coherent sources are not utilized, the color coded images are free from coherent artifact noise. Consequently, the system incorporating the method of the present invention can be computer controlled and is extremely effective in perceiving optical images as well as being extremely economical and reliable.

14 Claims, 7 Drawing Figures

SYSTEM OF WHITE-LIGHT DENSITY PSEUDOCOLOR ENCODING WITH THREE PRIMARY COLORS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to a method/system of white-light density pseudocolor encoding, and, more particularly, to a technique of generating density pseudocolor encoding with three primary colors using a white-light optical processor.

Most of the optical images obtained in various scientific applications are usually in the form of gray-level density images. For example, scanning electron microscopic images, multispectral aerial photographic images, x-ray transparencies, etc. are all gray-level images. It is well recognized, however, that humans can perceive in color better than they can perceive gray-level variations. In other words, a color coded image can provide the viewer with a greater ability for visual discrimination.

In current practice, most of the pseudocolorings are performed by use of a digital computer technique such as the type disclosed in an article by Andrews, H. C. et al, "Image processing by digital computer," *IEEE Spectrum*, July 1972, pp 20–32. Such a computer technique is a logical choice if the images are initially digitized. However, for continuous tone images, optical color encoding techniques such as the type described by the present inventor, Yu, F.T.S., *Optical Information Processing*, Wiley-Interscience Publishing Company, New York, 1982 would be more advantageous for at least the following three major reasons: (1) the technique and principle can preserve the spatial frequency resolution of the image to be color coded; (2) the optical system is generally easy and economical to operate; (3) the cost of an optical pseudocolor encoder is generally less expensive when compared with the digital counterpart.

Density pseudocolor encoding by half-tone screen implementation with a coherent optical processor was first reported by Liu, H. K. et al, "A New Coherent Optical Pseudo-Color Encoder," *Nouv. Rev. Opt.*, t. 7, no. 5, 1976, pp. 285–289 and later with a white-like processor by Tai, A. et al, "White-light pseudocolor density encoder," Opt. Lett., Vol. 3, Nov. 1978, pp. 190–192. Although good results have been subsequently reported there is a spatial resolution loss with the half-tone technique and a number of discrete lines due to sampling are generally present in the color-coded image.

Recently a technique which offers the advantages over the half-tone technique has been developed. This is a technique of density pseudocoloring through contrast reversal. An example of this technique can be found in an article by Santamaria, J. et al, "Optical Pseudocoloring Through Contrast Reversal Filtering," *J. Opt.*, Vol. 10, no. 4, 1979, pp 151–155. Although this density pseudocoloring technique offers several advantages over the half-tone technique, the optical system required therewith is more elaborate and requires both incoherent and coherent sources. Since a coherent source is utilized in such a system, coherent artifact noise is unavoidable.

More recently, the present inventor developed a density white-light pseudocolor encoding technique as set forth in an article by Chao, T. H. et al, "White-light pseudocolor density encoding through contrast reversal," *Opt. Lett.*, Vol. 5, No. 6, June 1980, pp. 230–232. This recent technique offers the advantages of coherent noise reduction, no apparent resolution loss, versatility and simplicity of system operation, and low cost pseudocoloring. Although excellent results have been reported by this technique, the pseudocolor encoding is primarily obtained by means of two primarily colors. More specifically, in this technique spatial encodings are made through positive and negative photographic image transparencies, and the pseudocoloring is obtained by color filtering of the smeared Fourier spectra.

Unfortunately, limiting the above-mentioned technique of density white-light pseudocoloring to only two primary colors constitutes a drawback in visual discrimination between images being viewed. It would therefore be highly desirable to provide a pseudocolor encoding technique capable of providing an even more discriminating color coded image.

SUMMARY OF THE INVENTION

The present invention overcomes the problems encountered in the past techniques of pseudocolor encoding as set forth in detail hereinabove by providing a technique of generating density pseudocolor encoding with three primary colors using a white-light optical processor. Spatial encodings are made with positive, negative and the product of the positive and negative photographic image transparencies while the pseudocoloring is obtained by color filtering of the smeared Fourier spectra. This technique is not only simple, but also extremely versatile and economical to operate. Since coherent sources are not utilized, the color coded image is free from coherent artifact noise.

More specifically, the white-light density pseudocolor encoding technique of the present invention incorporates therein three primary colors and encompasses the following steps:

Initially, a black and white transparency (a positive image) is obtained. This positive image may be in the form of, for example, an X-ray transparency. By any conventional contact printing process, a negative X-ray image transparency is produced. Thereafter superimposing the positive and negative transparencies, and by a conventional contact printing process it is possible to obtain a product image transparency, that is, the combination of both the positive and negative transparencies.

Thereafter, spatial encoding is performed by respectively sampling the positive, negative, and the product image transparencies onto a black and white photographic film with specific sampling grating frequencies oriented at specific azimuthal directions. To avoid the Moire fringe pattern, sampling of these three images takes place in the orthogonal direction with different specific sampling frequencies.

Once the above steps are completed, the encoded film is bleached to obtain a surface relief phase object. The object of the bleaching process is to increase the overall diffraction efficiency (that is, to enable more light to be used for color image retrieval).

At that point the bleached encoded film is inserted into the input plane of a conventional white-light optical processor or encoder of the type set forth by the present inventor in the above-mentioned article by Tai, A. et al, "White-light pseudocolor density encoder," *Opt. Lett.*, Vol. 3, Nov. 1978, pages 190–192. The three sets of images (that is, the positive, negative and product of the positive and negative) will be spatially separated in the Fourier plane of the white-light pseudocolor encoder into rainbow color of Fourier spectra. Since each first-order rainbow spectra contains the encoded image information with all visible color wavelengths, it allows any of the visible color (for example, red) to pass through as a color coded image in the output plane of the white-light pseudocolor encode with the use of Fourier plane color filters, preferably three primary color filters. Thus, the three spatially separated rainbow color spectra (that is, the image in Fourier forms) can be color coded with simple plastic color filters. These sets of color encoded images will then be formed at the output plane of the encoder. In the present pseudocoloring invention it is preferable to use Kodak primary color filters Nos. 25, 47B and 58 in the Fourier plane, with an xenon-arc lamp used as the extended white-light source for the pseudocolor encoder.

It is therefore an object of this invention to provide a method of white-light density pseudocolor encoding with three primary colors.

It is another object of this invention to provide a method of white-light density pseudocolor encoding with three primary colors that offers high resolution and high quality color coded images.

It is still another object of this invention to provide a method of white-light density pseudocolor encoding with three primary colors that is extremely inexpensive to perform.

It is an even further object of this invention to provide a system of white-light density pseudocolor encoding with three primary colors which utilizes conventional, currently available components within the procedure.

For a better understanding of the present invention, together with other and further objects thereof, reference is made to the following description, taken in conjunction with the accompanying drawings and its scope will be pointed out in the appended claims.

DETAILED DESCRIPTION OF THE PREFERRED METHOD/SYSTEM

The present invention is a technique/system of generating density pseudocolor encoding with three primary colors using a white-light optical processor or encoder. In order to obtain pseudocolor encoding with three primary colors the present invention begins the procedure with any suitable black and white (positive) transparency such as, for example, an X-ray transparency or the like. Utilizing this positive transparency, a negative transparency is produced by a conventional contact printing process. Thereafter, by superimposing the positive and negative transparencies described above, and utilizing a conventional contact printing process, a product image transparency is obtained. In other words, the product image transparency is the product of the positive and negative transparencies.

Once these three transparencies are obtained in the manner outlined above, a spatial encoding procedure is performed by respectively sampling the positive, negative and the product image transparencies onto a black and white photographic film. An example of such a film would be Kodak technical pan film 2415. The use of this film within the present invention is highly desirable since it has low contrast with a relatively flat spectral response.

Figure 1A:
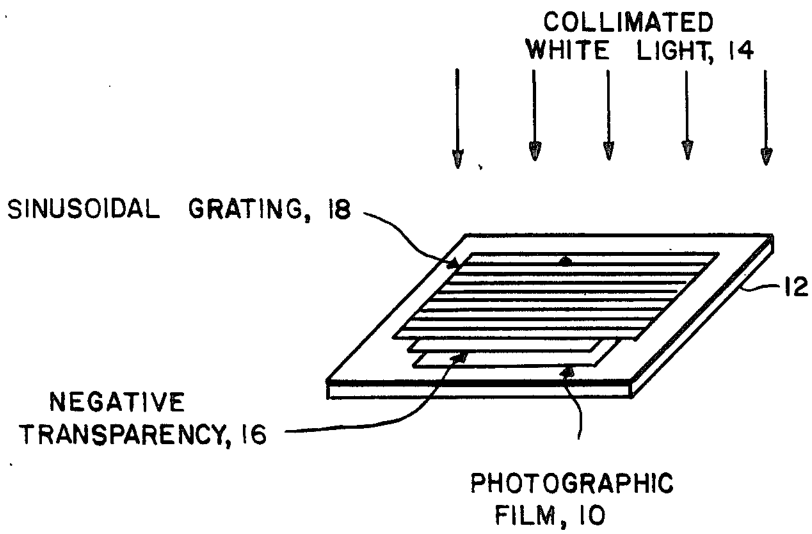
FIGS. 1A, 1B and 1C are pictorial, schematic representations of the steps of the present invention of spatially encoding transparencies onto a black and white photographic film.
Figure 1B:
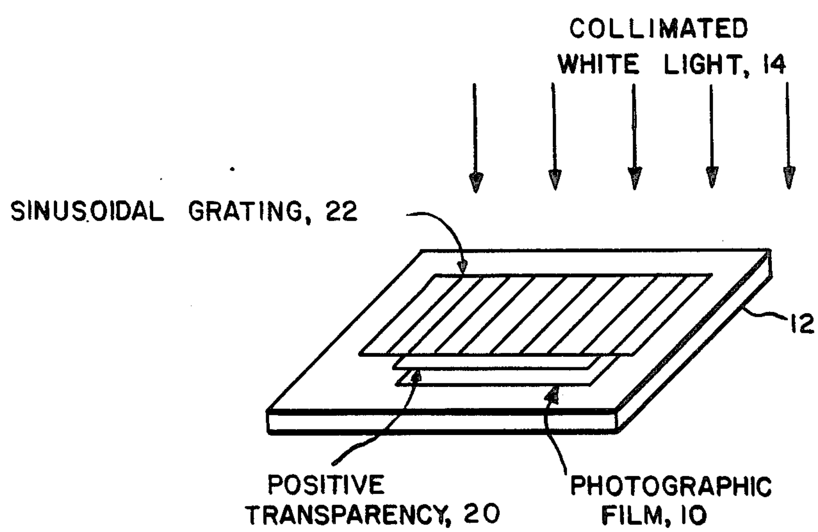
Figure 1C:
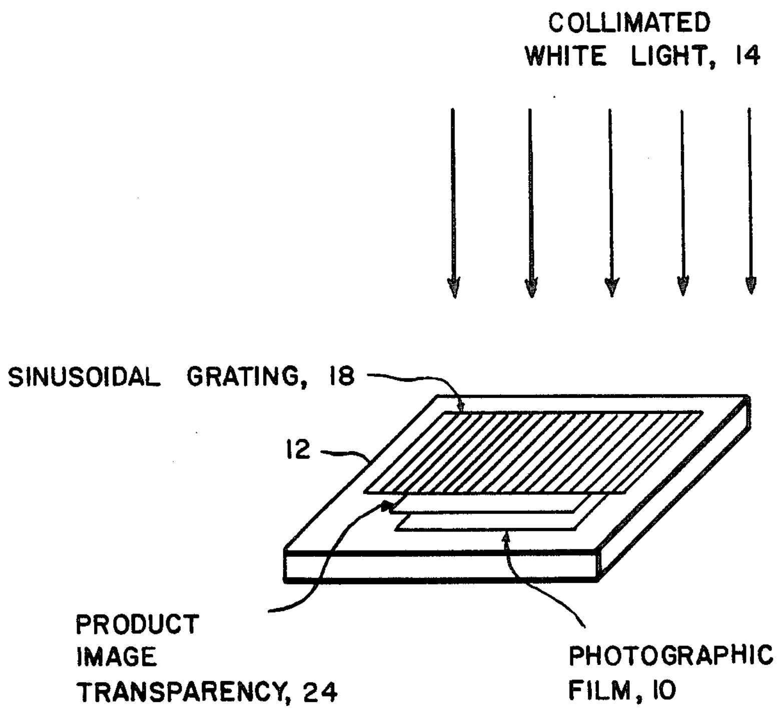

The specific spatial encoding steps of the present invention described above are more clearly understood when referring to FIGS. 1A, 1B and 1C of the drawings. As illustrated in FIG. 1A, initially the photographic film 10 is placed upon a glass plate 12 with a collimated white-light 14 being passed therethrough from above. Placed upon the photographic film 10 is the negative transparency 16. Upon the negative transparency 16 is placed a sinusoidal grating 18 having, for example, 26.7 lines/mm. As illustrated in FIG. 1B of the drawings, the negative transparency 16 and the grating 18 are then removed and replaced with the positive transparency 20 and a sinusoidal grating 22 preferably of 40 lines/mm, respectively. Thereafter, the positive transparency 20 and the sinusoidal grating 22 are removed and replaced with the product of the positive/negative transparency 24 and sinusoidal grading 18, respectively.

Following the above steps produces an encoded photographic film 10 with three sets of sampling images (that is, the postive, negative and product images) and each sample with different directions (that is, 90° apart) and different sampling frequencies.

As a further clarification or explanation of the above described encoding steps, the intensity transmittance of the encoded film 10 can be written as follows:

$$T(x,y) = K\{T_1(x,y)\,[1 + \mathrm{sgn}\,(\cos p_1 y)] + T_2(x,y)\,[1 + \mathrm{sgn}\,(\cos p_2 x)] + T_3(x,y)\,[1 + \mathrm{sgn}\,(\cos p_3 x)]\}^{-\gamma}, \quad (1)$$

where K is an appropriate proportionality constant, $T_1$, $T_2$, and $T_3$ are the positive, the negative, and the product image exposures, $p_1$, $p_2$, and $p_3$ are the respective carrier spatial frequencies, (x,y) is the spatial frequency coordinate system of the encoded film, $\gamma$ is the film gamma, and $$sng(\cos x) \triangleq \begin{cases} 1, & \cos x \geqq 0, \\ -1, & \cos x < 0. \end{cases} \quad (2)$$

At this point, the encoded transparency is bleached to obtain a surface relief phase object. The amplitude transmittance of this bleached transparency can be written as follows:

$$t(x,y)=exp[i\phi(x,y)], \tag{3}$$

where $\phi$(x,y) represents the phase delay distribution which is proportional to the exposure of the encoded film, such as $$\phi(x,y) = M\{T_1(x,y)[1+\mathrm{sgn}(\cos p_1 y)] + T_2(x,y)[1+\mathrm{sgn}(\cos p_2 x)] + T_3(x,y)[1+\mathrm{sgn}(\cos p_3 x)]\}, \tag{4}$$

where M is an appropriate proportionality constant.

Figure 2:
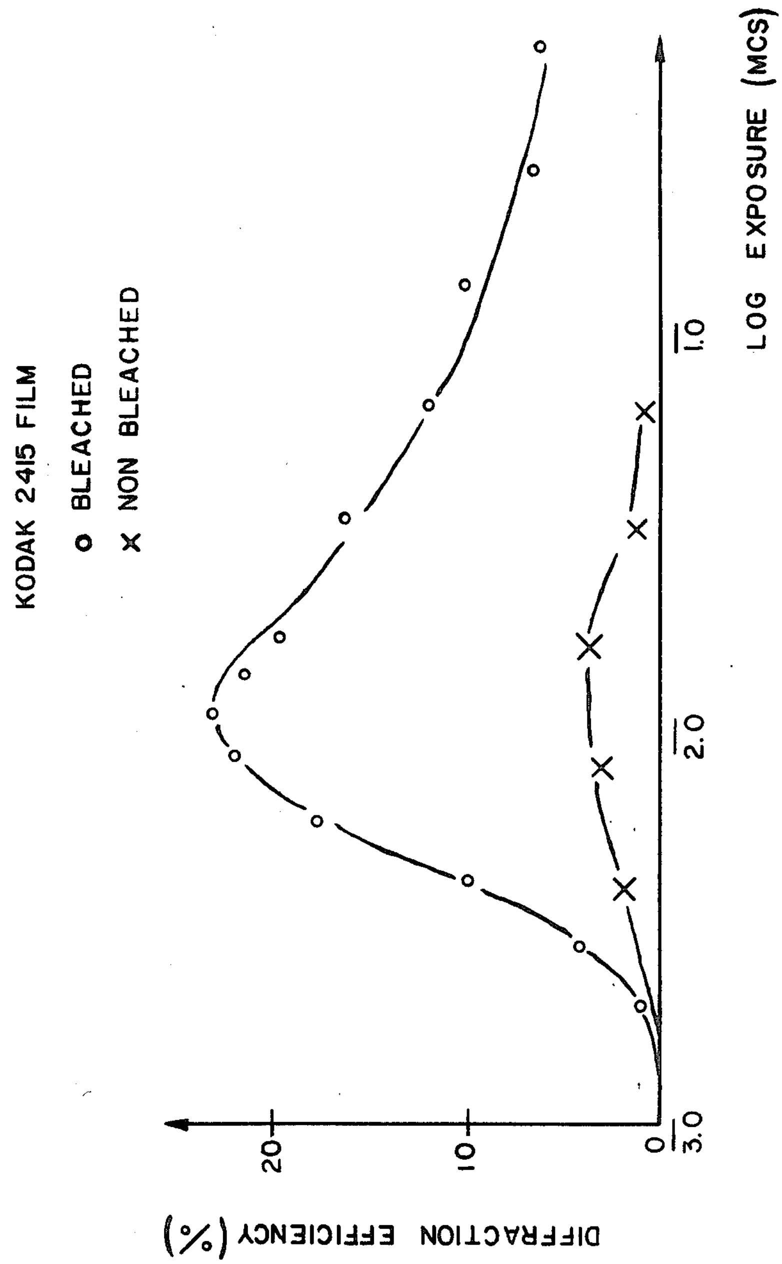
FIG. 2 is a graphic representation of diffraction efficiency versus log exposure plot of a typical spatially encoded film.

The object of the above-mentioned step of bleaching the encoded transparency is to increase the overall diffraction efficiency so that more light can be used for color image retrieval. FIG. 2 of the drawings illustrates graphically the difference between bleached and unbleached encoded films. More specifically, the plot of diffraction efficiency versus log-exposure for Kodak technical pan film 2415 at 40 lines/mm sampling frequency is clearly depicted in FIG. 2. From FIG. 2, it is possible to determine that bleached encoded films offer a higher diffraction efficiency, the optimum value occurring at exposures of $8.50\times10^{-3}$ mcs. With reference to this optimum exposure, it is possible to optimize the encoding process in the following manner: (1) preexposing the film beyond the shoulder region, and (2) subdividing the remaining exposure into three regions by taking into account the transmittent exposures of the three encoded images.

Figure 3:
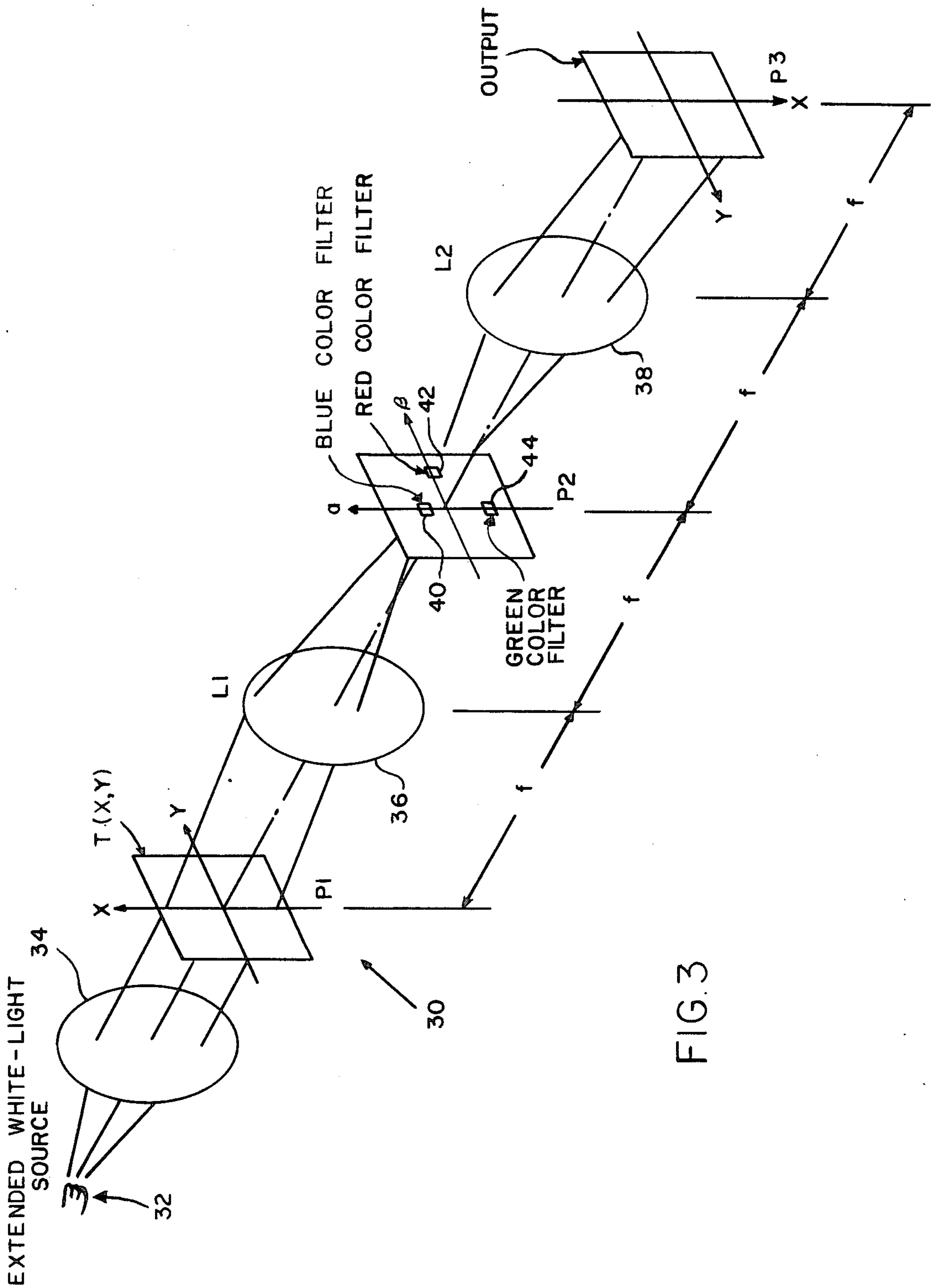
FIG. 3 is a schematic representation of a white-light pseudocolor processor or encoder utilized with the process of the present invention.

The encoded film is now inserted into input plane P1 of a typical white-light pseudocolor processor or encoder 30 as illustrated schematically in FIG. 3 of the drawings. For a more detailed analysis of such a white-light pseudocolor encoder 30 reference is made to an article by the present inventor as set forth in the above-mentioned article by Tai, et al, "White-light pseudocolor density encoder," *Optics Letters*, Vol. 3, Nov. 1978, pp. 190–192. Although the specifics of encoder 30 do not form part of the present invention and no further description need be given herein, it is pointed out that the various components of encoder 30 include an extended white-light source 32 in the form of, for example, an xenon-arc lamp, a plurality of lenses 34, 36 and 38, and color filters 40, 42 and 44 preferably in the form of Kodak primary color filters No. 25, 47B and 58, respectively. The filters 40, 42 and 44 are located in the Fourier plane P2 of encoder 30. The output plane of encoder 30 is designated as P3.

Still referring to FIG. 3 of the drawings, the bleached encoded film is placed in the input plane P1 of the white-light optical encoder 30 such that the complex light distribution due to t(x,y), for every λ, at the spatial frequency plane P2 can be determined by the following Fourier transformation:

$$S(\alpha,\beta;\lambda) = \int\int t(x,y)\exp\left[-i\frac{2\pi}{\lambda f}(\alpha x+\beta y)\right]dx\,dy = \int\int \exp[i\phi(x,y)]\exp\left[-i\frac{2\pi}{\lambda f}(\alpha x+\beta y)\right]dx\,dy. \tag{5}$$

By expanding t(x,y) into an exponential series, Eq. (5) can be written as $$S(\alpha,\beta;\lambda) = \int\int\{1+i\phi(x,y)+\tfrac{1}{2}[i\phi(x,y)]^2+\dots\} \tag{6}$$

-continued $$\exp\left[-i\frac{2\pi}{\lambda f}(\alpha x+\beta y)\right]dx\,dy.$$

Figure 4:
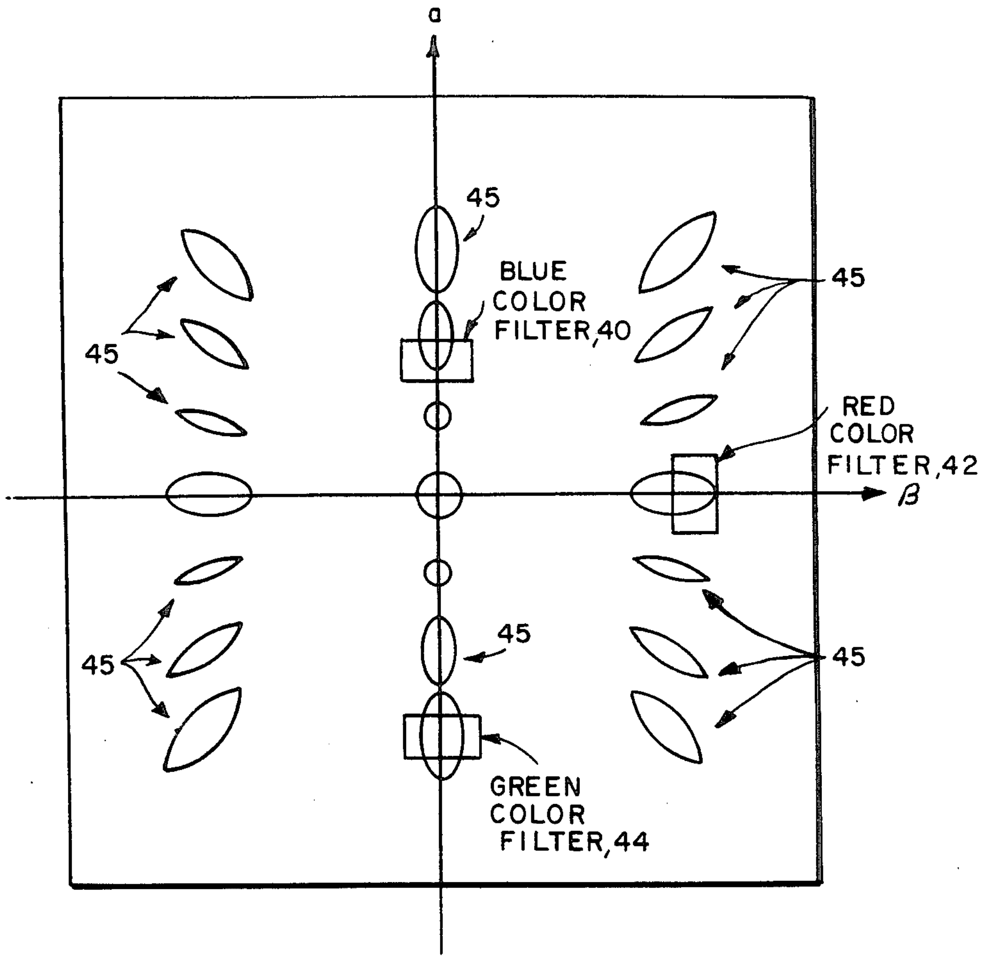
FIG. 4 is a schematic representation of the Fourier plane color filtering step of the present invention.

By substituting Eq. (4) into Eq. (6) and retaining the first-order terms and the first-order convolution terms, we have:

$$(\alpha,\beta;\lambda) = \hat{T}_1\left(\alpha,\beta\pm\frac{\lambda f}{2\pi}p_1\right) + \hat{T}_2\left(\alpha\pm\frac{\lambda f}{2\pi}p_2,\beta\right) + \hat{T}_3\left(\alpha\pm\frac{\lambda f}{2\pi}p_3,\beta\right) + \hat{T}_1\left(\alpha,\beta\pm\frac{\lambda f}{2\pi}p_1\right) * \hat{T}_2\left(\alpha\pm\frac{\lambda f}{2\pi}p_2,\beta\right) + \hat{T}_1\left(\alpha,\beta\pm\frac{\lambda f}{2\pi}p_1\right) * \hat{T}_3\left(\alpha\pm\frac{\lambda f}{2\pi}p_3,\beta\right) + \hat{T}_2\left(\alpha\pm\frac{\lambda f}{2\pi}p_2\beta\right) * \hat{T}_3\left(\alpha\pm\frac{\lambda f}{2\pi}p_3,\beta\right). \tag{7}$$

where $\hat{T}_1$, $\hat{T}_2$ and $\hat{T}_3$ are the Fourier transforms of $T_1$, $T_2$ and $T_3$ respectively, * denotes the convolution operation, and the proportional constants have been neglected for simplicity. We note that, the last cross product term of Eq. (7) would introduce a Moire fringe pattern, which is in the same sampling direction of $p_2$ and $p_3$. Nevertheless, all of these cross product terms can be properly masked out at the Fourier plane P2. Thus by proper color filtering the first-order smeared Fourier spectra, as shown in FIG. 4, a Moire free pseudocolor coded image can be obtained at the output plane P3. The corresponding complex light field immediately behind the Fourier plane would be:

$$S(\alpha,\beta) = \hat{T}_1\left(\alpha,\beta-\frac{\lambda_r f}{2\pi}p_1\right) + T_2\left(\alpha-\frac{\lambda_b f}{2\pi}p_2,\beta\right) + T_3\left(\alpha+\frac{\lambda_g f}{2\pi}p_3,\beta\right), \tag{8}$$

where $\lambda_r$, $\lambda_b$ and $\lambda_g$ are the respective red, blue, and green color wavelengths. At the output image plane, the pseudocolor coded image irradiance is therefore, $$I(x,y)=T^2{}_{1r}(x,y)+T^2{}_{2b}(x,y)+T^2{}_{3g}(x,y). \tag{9}$$

which is a superposition of three primary color encoded images, where $T_{1r}$, $T_{2b}$, and $T_{3g}$ are the red, blue, and green amplitude distributions of the three spatially encoded images. Thus a Moire free color coded image can be obtained at the output plane P3.

For a clearer understanding of the above filtering procedure reference is once again made to FIGS. 3 and 4 of the drawings. As stated above, the three sets of images will be spatially separated in the Fourier plane P2 of white-light pseudocolor encoder 30 into rainbow color of Fourier spectra (Fourier spectra smear) represented schematically by the oblong configurations 45 clearly depicted in FIG. 4 of the drawings. Since each first order rainbow spectra contains encoded image information with all visible color wavelengths, it allows any of the visible color (for example red) to pass through as a color coded image in output plane P3 when filters 40, 42 and 44 are placed in Fourier plane P2. As clearly shown in FIGS. 3 and 4 three such filters representative of the primary colors blue, red and green are preferably used with the method of the present invention for optimum color coding. However, it should be realized that under certain conditions, if particular color coding is required, other colors and numbers of filters may be used with the present invention. In addition, it is pointed out that the actual size of each filter 40, 42 and 44 may also vary within the scope of this invention. Actual control of the filters can be computerized, if desired, in the manner illustrated in FIG. 5 of the drawings and as described hereinbelow.

Since each first-order rainbow spectra contains the encoded image information with all visible color wavelengths, therefore, by allowing any of the visible color (for example, red) to pass through with spectral filtering, a color coded image would be formed in the output plane P3 of encoder 30 as illustrated in FIG. 3 of the drawings.

As an example of the effectiveness of the method of the present invention, one would first provide a gray-level X-ray picture. This X-ray picture would be color encoded by the white-light pseudocolor encoder 30. In this color coded image the positive image would encoded in red, the negative image would be encoded in blue and the product transmittance of the positive and negative images would encoded in green. With the present method it would be possible to provide a broad range of pseudocolor encoded density, and the color-coded image would appear free from coherent artifact noise and Moire fringes. It also interesting to note that a reversal of the color encoding process of the present invention could also be easily obtained.

Figure 5:
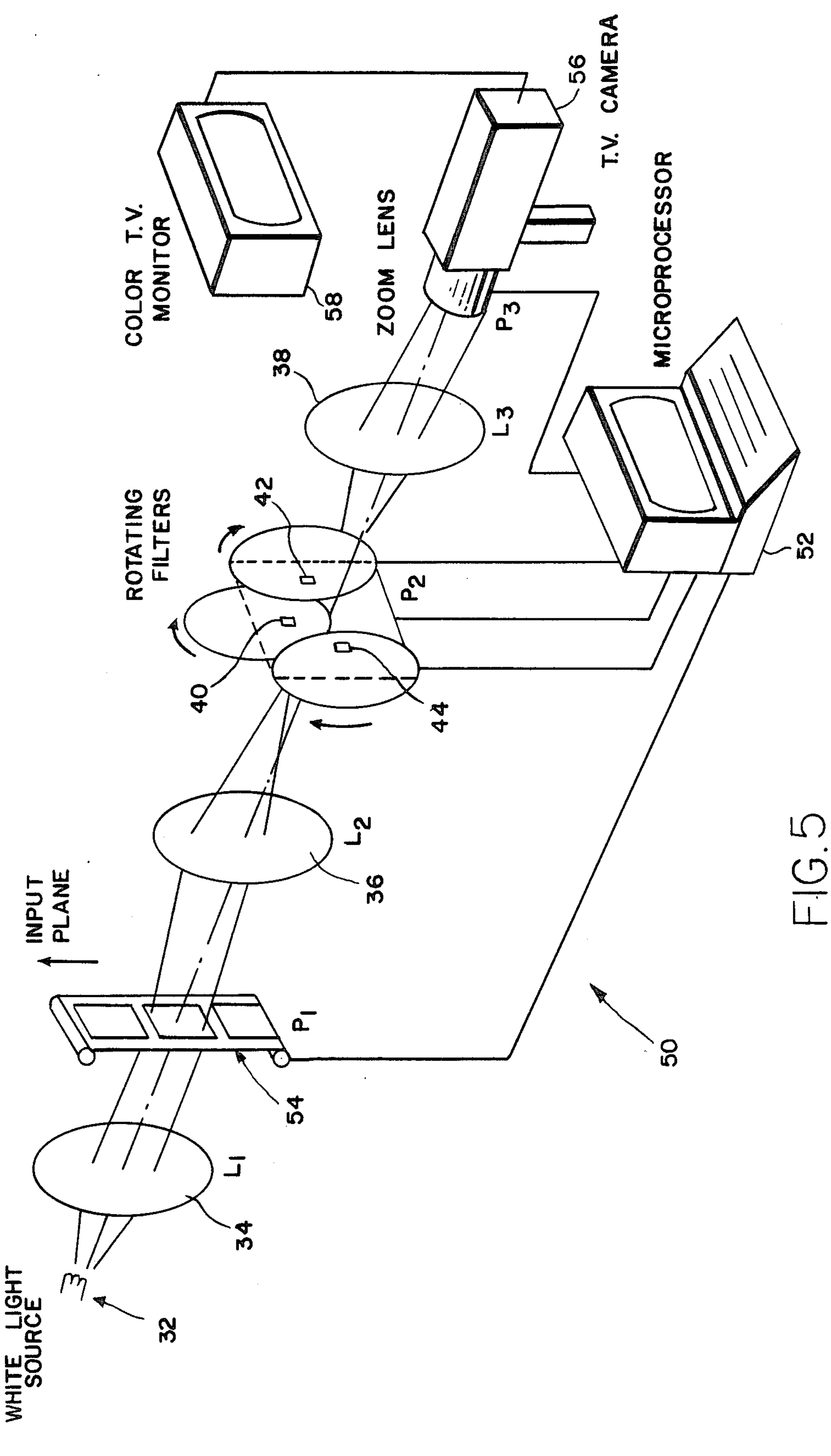
FIG. 5 is a pictorial representation of the white-light density pseudocolor encoding system of the present invention incorporating therein a programmable computer control.

Reference is now made to FIG. 5 of the drawing which pictorially/schematically illustrates the method of the present invention being performed by a computer controlled system 50. Because of the low coherence requirement, the set up incorporating the present method therein can be rather simple with the color filters 40, 42 and 44 being controlled by a programmable microprocessor 52. This microprocessor may be in the form of any inexpensive computer such as the TRS-80 Radio Shack or Apple Computer.

As clearly seen in FIG. 5 of the drawings, the set up depicted therein is quite similar to the white-light pseudocolor encoder 30 illustrated in FIG. 3 of the drawings with the majority of the components such as the extended white-light source 32 and lenses 34, 36 and 38 being identical to those used within the pseudoencoder 30 illustrated in FIG. 3. Consequently, identical reference numerals will be given to identical elements in both of the Figures. The major difference being that within the system 50 depicted in FIG. 5 of the drawings the bleached transparency 54 residing in the input plane P1 as well as the plurality of filters 40, 42 and 44 within Fourier plane P2 are under synchronized control by microprocessor 52. Furthermore, the image received at the output plane P3 can be received by any conventional TV camera 56 and depicted on a conventional color TV monitor 58 both also under the control of microprocessor 52. Because microprocessor 52 used within system 50 is relatively inexpensive, the whole system 50 utilized with the process of the present invention should fall within the $3,000 to $5,000 range, in contrast with past digitized techniques which cost over $100,000.

Although this invention has been described with reference to a particular method, it will be understood that this invention is also capable of other variations of this method within the spirit and scope of the appended claims.

I claim:

1. A method of white-light density pseudocolor encoding with three colors comprising the steps of:

(a) providing a positive transparency of subject matter under observation;

(b) producing a negative transparency from said positive transparency;

(c) obtaining a product image transparency from said positive and negative transparencies;

(d) sequentially sampling said positive transparency, said negative transparency, and said product image transparency onto a black and white photographic film to produce a spatially encoded photographic film with three sets of images thereon;

(e) inserting said spatially encoded photographic film into the input plane of a white-light pseudocolor encoder; and (f) color filtering the image obtained in the Fourier Transform plane of the white-light pseudocolor encoder in order to form a color coded image of said subject matter in the output plane of the white-light pseudocolor encoder, said color coded image being generated with three colors.

2. A method of white-light density pseudocolor encoding as defined in claim 1 wherein said spatially encoded photographic film is bleached prior to its insertion into the white-light pseudocolor encoder in order to increase the overall diffraction efficiency of said spatially encoded photographic film.

3. A method of white-light density pseudocolor encoding as defined in claim 1 wherein said step of color filtering includes inserting a plurality of different colored filters into the Fourier Transform plane of the white-light pseudocolor encoder.

4. A method of white-light density pseudocolor encoding as defined in claim 3 wherein three filters are inserted into the Fourier Transform plane of the white-light pseudocolor encoder.

5. A method of white-light density pseudocolor encoding as defined in claim 4 wherein said three filters contain the primary colors of blue, red and green, respectively.

6. A method of white-light density pseudocolor encoding as defined in claim 5 wherein said spatially encoded photographic film is bleached prior to its insertion into the white-light pseudocolor encoder in order to increase the overall diffraction efficiency of said spatially encoded photographic film.

7. A method of white-light density pseudocolor encoding as defined in claim 6 wherein said negative transparency and said positive negative transparency are produced by a contact printing process.

8. A method of white-light density pseudocolor encoding as defined in claim 1 wherein said step of sequentially sampling said positive transparency, said negative transparency, and said combination positive/negative transparency onto a black and white photographic film includes the use of a pair of different sinusoidal gratings.

9. A method of white-light density pseudocolor encoding as defined in claim 7 wherein said step of sequentially sampling said positive transparency, said negative transparency, and said combination positive/negative transparency onto a black and white photographic film includes the use of a pair of different sinusoidal gratings.

10. A system for pseudocolor encoding with three colors comprising:

(a) a white-light density pseudocolor encoder having a white light source, a first lens optically aligned with said white light source, a second lens optically aligned with said first lens and a third lens optically aligned with said second lens, wherein an input plane is established between said first lens and said second lens for receiving a spatially encoded photographic film with three images thereon, a Fourier Transform plane is established between said second lens and said third lens, and an output plane is established after said third lens;

(b) three individual filters located adjacent said Fourier Transform plane;

(c) means optically aligned with said output plane for receiving an image generated in said output plane;

(d) means connected to said image receiving means for displaying said image generated in said output plane; and (e) means operably connected to said spatially encoded photographic film, said individual filters and said image receiving means for controlling the operation of said filters in accordance with the type of spatially encoded film in said input plane and the type of image to be received by said image receiving means.

11. A system for pseudocolor encoding with three colors as defined in claim 10 wherein said controlling means is in the form of a computer.

12. A system for pseudocolor encoding with three colors as defined in claim 11 wherein said image receiving means is in the form of a TV camera.

13. A system for pseudocolor encoding with three colors as defined in claim 12 wherein said image displaying means is in the form of a TV monitor.

14. A system for pseudocolor encoding with three colors as defined in claim 10 wherein said thre filters are blue, red and green, respectively.

* * * * *